United States Patent
Kennedy (10) Patent No.: US 10,354,248 B2
(45) Date of Patent: Jul. 16, 2019

(54) CURRENCY CONVERSION SYSTEM AND METHOD

(71) Applicant: FEXCO Merchant Services Unlimited Company, Killorglin, Co. Kerry (IE)

(72) Inventor: Adrian Gerald Kennedy, Killorglin (IE)

(73) Assignee: FEXCO MERCHANT SERVICES UNLIMITED COMPANY (IE)

( * ) Notice: Subject to any disclaimer, the term of this patent is extended or adjusted under 35 U.S.C. 154(b) by 274 days.

(21) Appl. No.: 15/147,527

(22) Filed: May 5, 2016

(65) Prior Publication Data

US 2016/0328706 A1 Nov. 10, 2016

Related U.S. Application Data

(60) Provisional application No. 62/157,291, filed on May 5, 2015.

(51) Int. Cl.
*G06Q 20/38* (2012.01)
*G06Q 20/20* (2012.01)
*G06Q 20/34* (2012.01)

(52) U.S. Cl.
CPC ......... *G06Q 20/381* (2013.01); *G06Q 20/202* (2013.01); *G06Q 20/204* (2013.01); *G06Q 20/346* (2013.01)

(58) Field of Classification Search
CPC .. G06Q 20/381; G06Q 20/204; G06Q 20/202; G06Q 20/346

(Continued)

(56) References Cited

U.S. PATENT DOCUMENTS 9,757,644 B2 * 9/2017 Rose ..................... A63F 13/00
2004/0148255 A1 * 7/2004 Beck ..................... G06Q 10/02
705/39

(Continued)

FOREIGN PATENT DOCUMENTS

AU 2013201182 A1 3/2013
AU 2015201705 A1 4/2015

OTHER PUBLICATIONS

International Search Report and Written Opinion dated Sep. 6, 2016 for International Patent Application No. PCT/IB2016/000661, 10 pages.

(Continued)

*Primary Examiner* — Vanel Frenel
(74) *Attorney, Agent, or Firm* — Kilpatrick Townsend & Stockton LLP (57) ABSTRACT

A system and method for converting the amount of a transaction at a POS terminal from a local currency used by a merchant to an alternative currency (e.g., the home currency of the card). Card currency data obtained from a financial card is provided to a remote currency conversion system. The POS terminal determines whether a chip card is being used for the transaction, and if it is, card currency data on the card is accessed. The cardholder is provided a choice of completing the transaction using either the local currency or the home currency. On the other hand, if a card with a magnetic stripe is being used for the transaction, card number information on the magnetic stripe is used to determine possible home currencies and receive a selection from the cardholder of one of the possible home currencies or the local currency.

16 Claims, 7 Drawing Sheets

(58) Field of Classification Search
USPC .......... 705/17, 18, 21, 44, 39, 41; 455/41.1; 235/379, 380; 194/206
See application file for complete search history.

(56) References Cited

U.S. PATENT DOCUMENTS

| | | | | |
|---|---|---|---|---|
| 2005/0154674 A1 | 7/2005 | Nicholls | | |
| 2007/0145121 A1* | 6/2007 | Dallal | ................... | G06Q 20/341 235/380 |
| 2009/0177579 A1* | 7/2009 | Ling | ..................... | G06Q 20/10 705/39 |
| 2009/0242626 A1* | 10/2009 | Jones | ..................... | G06Q 40/00 235/379 |
| 2010/0036741 A1* | 2/2010 | Cleven | ................. | G06Q 20/105 705/17 |
| 2012/0011070 A1* | 1/2012 | Ward | ..................... | G06Q 20/20 705/72 |
| 2013/0151406 A1* | 6/2013 | Raja | ..................... | G06Q 20/10 705/41 |
| 2013/0304642 A1* | 11/2013 | Campos | ................. | G06Q 20/36 705/41 |
| 2016/0267462 A1* | 9/2016 | Batlle | ................. | G06Q 20/3255 |
| 2017/0344991 A1* | 11/2017 | Mark | ................... | G06Q 20/401 |

OTHER PUBLICATIONS

International Preliminary Report on Patentability of PCT/IB2016/000661 dated Nov. 16, 2017, all pages.

* cited by examiner

CURRENCY CONVERSION SYSTEM AND METHOD

CROSS-REFERENCES TO RELATED APPLICATIONS

This application claims the benefit of U.S. Patent Application No. 62/157,291 filed May 5, 2015 and titled "Currency Conversion System and Method", the entire disclosure of which is hereby incorporated by reference herein for all purposes.

BACKGROUND OF THE INVENTION

Consumers conducting a transaction using a financial card, such as credit card, will sometimes use the card at a merchant point-of-sale (POS) terminal in a country that has a local currency different than the primary currency (home currency) of the cardholder.

For example, a consumer may be issued a credit card by a US bank, and transactions posted against the card will be posted in US dollars (the home currency). The customer may want to use the same card at a merchant outside of the US, where that merchant will typically use a foreign, local currency in establishing the amount of the transaction. The local currency is later converted by the issuer when posting transactions to the card account and sending a statement to the cardholder for payment. As an example, the card issuer may prepare a card statement that shows, for any transaction conducted using currency other than the home currency, the amount of the transaction in the local currency of the merchant and the amount of the transaction converted to the home currency.

More recently, dynamic currency conversion (DCC) permits transactions to be processed in a home currency, even when the transaction is conducted at a merchant that uses a different currency. Systems implementing DCC determine the home currency and apply an exchange rate at the time of the transaction. The home currency can be determined at the POS terminal, for example, by accessing the bank identification number (BIN) included in the account number stored at a magnetic stripe on the card and, more recently, for chip-based smart cards, by accessing an application currency code (ACC) stored as a "tag" in the memory of the chip card.

DCC is thus a service that a merchant may offer (e.g., through its card payment processor) to customers as a convenience. The merchant usually establishes and controls the exchange rates that will be used to convert the transaction amount. A customer may approve the converted transaction amount (e.g., by signing a printed receipt or tapping an "approval" button at the POS terminal). A customer is thus made aware of and accepts, at the time the transaction is conducted at the merchant location, the exact home currency value of the transaction that will be processed and posted to the customer's account.

Difficulties sometimes arise in the conversion of a transaction amount to the home currency of the card. For example, while the POS terminal at which the transaction is conducted may store exchange rates that can be accessed based on the ACC, those exchange rates may not reflect the latest currency fluctuations, and may provide a converted home currency that is not entirely up-to-date. If the merchant desires to maintain up-to-date exchange rates, frequent downloading of exchange rates (daily or several times per day) may be needed, which may in turn slow down the processing of transactions at the POS terminal. As another example, the merchant operating the POS terminal may not want to conduct certain transactions in a currency other than its local currency, particularly if that other currency is one that is subject to frequent or volatile fluctuations and risk. Thus, the merchant may want greater control over whether or not to use DCC for any given transaction.

Further, in some cases, the existence of the ACC stored on a chip may not provide enough information to the merchant or to an issuer to determine whether they would be willing to use home currency in DCC. Thus there has arisen the need for more control by the merchant and the issuer in providing dynamic currency conversion, rather than merely relying on whether or not an ACC (reflecting home currency) is stored on the chip card.

BRIEF SUMMARY OF THE INVENTION

There is provided, in accordance with embodiments of the present invention, a method and/or system for converting the amount of a transaction from a local currency used by a merchant to an alternative currency (the home currency of the card or another, stable currency used by the cardholder), where the cardholder may be using a card or presentation device having any one of various different forms.

In one embodiment, a method is used to process a card transaction conducted by a cardholder at a POS terminal operated by a merchant, where the merchant conducts business using a local currency, and where the card is issued for transactions using a different, home currency. The method includes determining whether the card stores currency data identifying the home currency and whether the card separately stores country-related data (other than the currency data) that may be used to identify the home currency or another currency to which the local currency may be converted. The currency data and other country-related data stored on the card may be accessed from the POS terminal and, with terminal country data stored at the POS terminal, sent to a currency conversion system remote from the POS terminal with a request for an exchange rate based on the accessed data. The method further includes, in response to the request, receiving the exchange rate from the currency conversion system, calculating at the POS terminal the amount of the transaction with the received exchange rate, and receiving at the POS terminal approval from the cardholder for the calculated amount of the transaction.

A more complete understanding of the present invention may be derived by referring to the detailed description of the invention and to the claims, when considered in connection with the Figures.

DETAILED DESCRIPTION OF THE INVENTION

Figure 1:
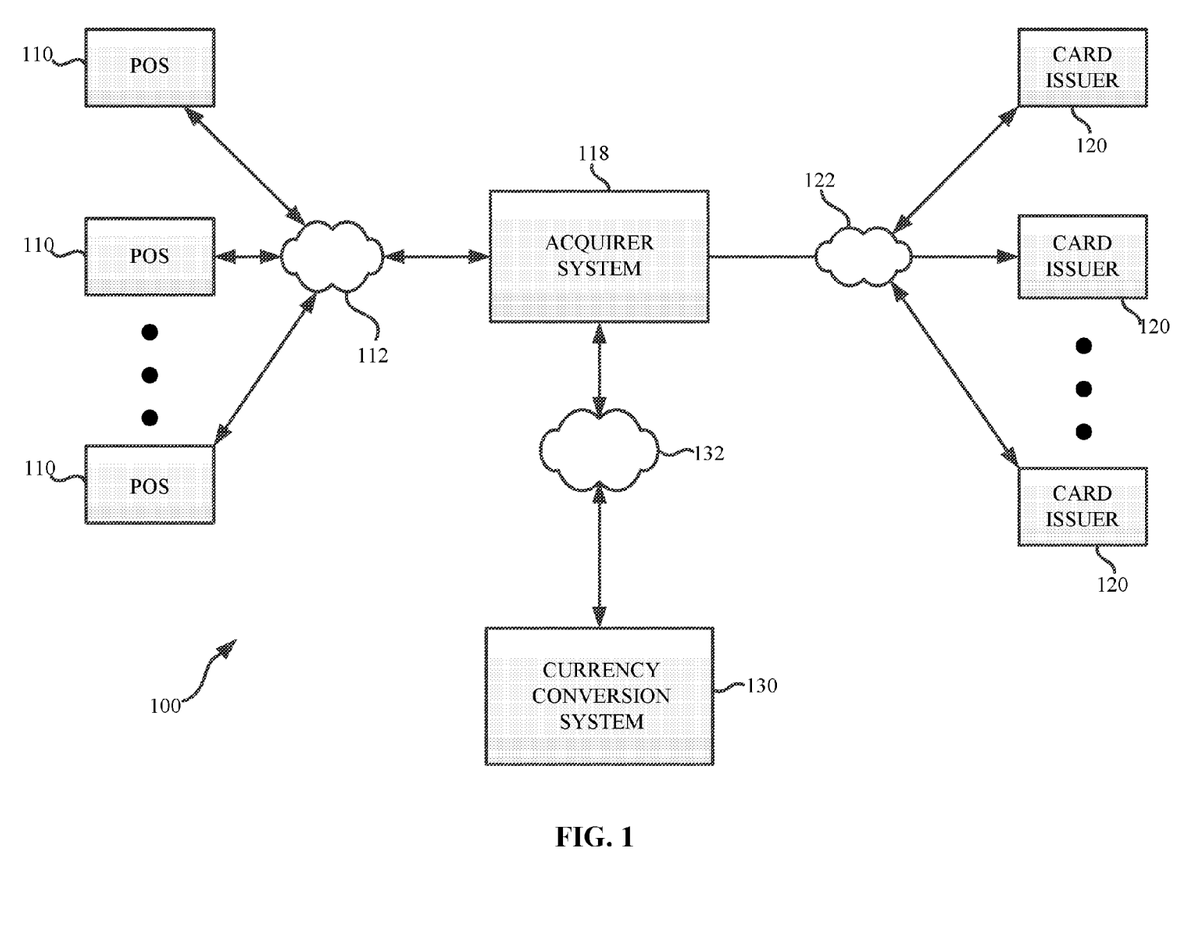
FIG. 1 is a general block diagram showing a payment processing network in which a cardholder may conduct transactions at merchant POS terminals that use a local currency that is different than the cardholder home currency.

There are various embodiments and configurations for implementing the present invention. One such implementation is shown in FIG. 1, where according to an embodiment of the invention, a payment processing network 100 is illustrated. The network 100 includes a plurality of point-of-sale (POS) terminals 110 that are connected through a communications network 112 to an acquirer system 118. The acquirer system 118 represents one or more transaction processing systems that process credit card and similar transactions for a merchant operating one or more of the POS terminals 110. It should be understood that the illustrated POS terminals 110 may be operated by the same merchant or by more than one merchant, and the acquirer system 118 may represent more than one acquirer system (e.g., different merchants may use different acquirer systems).

In the payment processing network 100, it is anticipated that cardholders using credit cards at POS terminals 110 may have cards issued by different card issuers, such as the multiple card issuers 120 illustrated in FIG. 1. The card issuers 120 communicate with the acquirer system 118 by way of a communications network 122, with the acquirer system 118 processing card transactions from a merchant and routing the card transaction to the appropriate card issuer for approval. It is further anticipated that customers may want to know (and approve) the amount of a transaction in a currency other than the local currency used by the merchant operating any one of the POS terminals 110. For such purpose, a currency conversion system 130 communicates with the acquirer system 118 by way of a communications network 132.

The illustrated networks 112, 122 and 132 may each be implemented by a single network or multiple networks. For example, POS terminals 110 operated by one merchant may be connected to one of the acquirer systems 118 through a different network than POS terminals operated by different merchant, in order for each merchant to communicate with and process transactions through its respective acquirer system 118. The networks 112, 122 and 132 may each be implemented (in whole or in part) by dedicated private networks operated by the merchant, acquirer, and/or issuer, or may be implemented (in whole or in part) by a public network, such as the Internet.

In the payment processing network 100, it is also anticipated that the merchants operating the POS terminals 110 normally process transactions using the local currency of the merchant, but may be able to also process a transaction amount in a home currency of a card (or an alternative currency that may be used/preferred by the cardholder) that is foreign or different than the local currency. For example, the merchant may be able to provide the amount of the transaction in the home currency of the cardholder/card issuer, so that cardholder knows at the time of the transaction the transaction amount (in the home currency) that will be posted to the cardholder's account and that will be paid by the cardholder (e.g., after receiving the cardholder's monthly statement). As such, and is will be more fully described later, the currency conversion system 130 may, among other things, receive requests from one of the POS terminals 110 for an exchange rate to be used at one of the POS terminals, in order to provide to a customer or cardholder the amount of a transaction, converted from the local currency of the merchant to the home currency of the customer.

Further, in some cases (and as will also be described later), the currency conversion system 130 may enable an issuer (or merchant), if unwilling to convert local currency into a home currency (e.g., when the home currency is seen as a higher risk than very stable or strong currencies, such as due to volatile fluctuations values) to access other data resident on the chip card (and from the terminal) to determine a stable currency to offer under DCC to the cardholder. In this context, it should be appreciated that, in some cases, the home currency of the cardholder may be that of a small country (or otherwise not a major or strong currency), where there is not regular or significant need for currency conversation, and so while perhaps not subject to volatile fluctuations in value, the cost of conversion may be higher. For purposes of the present description, a currency of such a country (even if not volatile) might be deemed not "stable" when determining whether to use as a home currency.

It should be further understood that while the description thus far refers to credit card transactions, embodiments of the invention represented by network 100 could be used to process transactions using other types of financial or transaction cards, such as debit cards, loyalty cards, ATM cards, and stored value cards, as well as instruments having many different structures, such as traditional mag stripe cards, contact or contactless smart cards (that have embedded electronic chips, circuitry and/ or memory), key fobs acting as wireless payment devices, virtual cards, mobile phones and tablets, and other forms of presentation instruments that may be used by a cardholder to conduct transactions with any other party (merchant or non-merchant).

Figure 2:
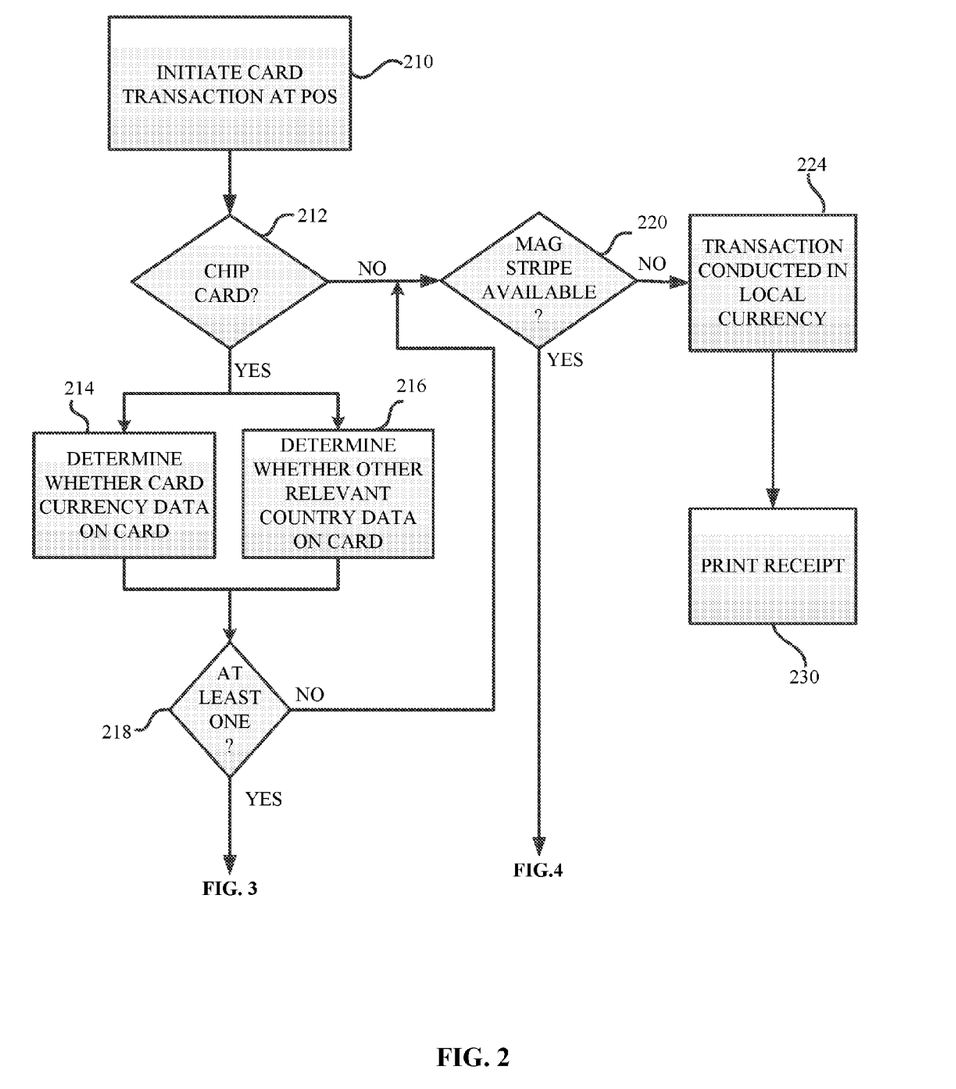
FIG. 2 illustrates a general process for determining, at a POS terminal, whether to offer currency conversation, based on either chip card data or mag stripe data.

In described embodiments, a merchant operating one of the POS terminals 110 is able to process transactions with customers that may use different forms of cards, where either the merchant or the customer may (or may not) want to conduct the transaction in the local currency used by the merchant. FIG. 2 is a flow diagram illustrating a process by which a merchant determines whether or not to conduct a transaction in its own local currency, or in a foreign currency that is the home currency of a cardholder customer (or another stable currency that may be acceptable to the customer). At step 210, a customer initiates a card transaction at a POS terminal 110, with the POS terminal 110 first determining whether the card presented is a chip card (smart card), step 212. In some embodiments, step 212 may be implemented with assistance from a cashier at the POS terminal 110, by simply observing the physical characteristics of a card presented and entering, at the terminal, the type of card. In other cases, the card may be inserted into a slot at a POS terminal (either at a self-service terminal, or a terminal operated by cashier) and the terminal itself may make the determination of what type of card is involved. In yet other embodiments, step 212 may be implemented, at least in part, by signals received at the POS terminal 110 from a contactless (wireless) smart card (thus indicating, for a given transaction, that a smart card is being used for that transaction).

If a chip or smart card has been presented by the customer, the POS terminal determines if home currency data is stored on the chip, at step 214. For example, when a transaction is conducted with a smart card implementing EMV standards defined and managed by EMVCo LLC (as described at emvco.com), a processing options data objects list (PDOL), which includes a list of data elements or "tags," may be provided by the smart card to the POS terminal when a common payment application (resident on the chip card and the terminal) is selected and used to initiate the transaction. The tags may include an optional application currency code (ACC), which defines the home currency of the card being used. The value of the code will indicate the currency of a specific country. If the tag location for the ACC in the memory of the chip has a null or zero value, then there is no home currency. If home currency is provided to the POS terminal at step 214, then that home currency may be used in deciding whether to provide a transaction amount to the cardholder in the home currency (or some other, stable currency), in a manner to be described below in conjunction with FIG. 3. Further information on tags available for implementing EMV standards can be found in the "Common Payment Application Specification," Version 1.0 (2005), found on the emvco.com website, and hereby incorporated by reference.

The terminal also determines whether other country data (relevant to DCC) is present at the chip, step 216. Examples of country-relevant data will be described later. However, briefly, this data relates to the country of the issuer or the cardholder, and can be used to determine a currency that is either the home currency of the card or that is stable and may be acceptable to the cardholder (even though not the home currency). If there is at least one of the currency data or country-related data stored on the card (step 218), then the process proceeds to FIG. 3 (to determine whether a converted currency should be offered to the customer).

If the card presented to the POS terminal is not a chip card at step 212, or if there is not at least one of the currency data (step 214) or other country-related data (step 216) available from the chip (step 218), then it is determined whether a magnetically encoded stripe (mag stripe) is available on the card at step 220.

If the card presented to the POS terminal is not a chip card at step 212, or if a chip card is presented but neither card currency data nor country data is not provided from the chip to the POS terminal at steps 214 and 216, then it is determined whether a magnetically encoded stripe (mag stripe) is available on the card at step 220. Step 220 may be implemented, at least in part, by a cashier observing the card being presented by a cardholder. Alternatively, and as an example, if the POS terminal 110 is a self-service terminal, a card reader at the terminal may detect the mag stripe and the data stored on the magnetic stripe at step 220. If a mag stripe is available, then home currency may be determined in a manner to be described shortly in conjunction with FIG. 4. If there is no mag stripe available at step 220, then the transaction is conducted in the local currency of the merchant POS terminal at step 224, for example, by the clerk manually entering a card number that may appear on the card. After the transaction is conducted at step 224, a receipt is printed at step 230 and provided to the customer/cardholder.

In some cases, for example, where a mag stripe is present on a card but cannot be read, the clerk may manually enter the card number. In such case, home currency may be determined based on the manually entered card number and the determined location of the card issuer.

Figure 3:
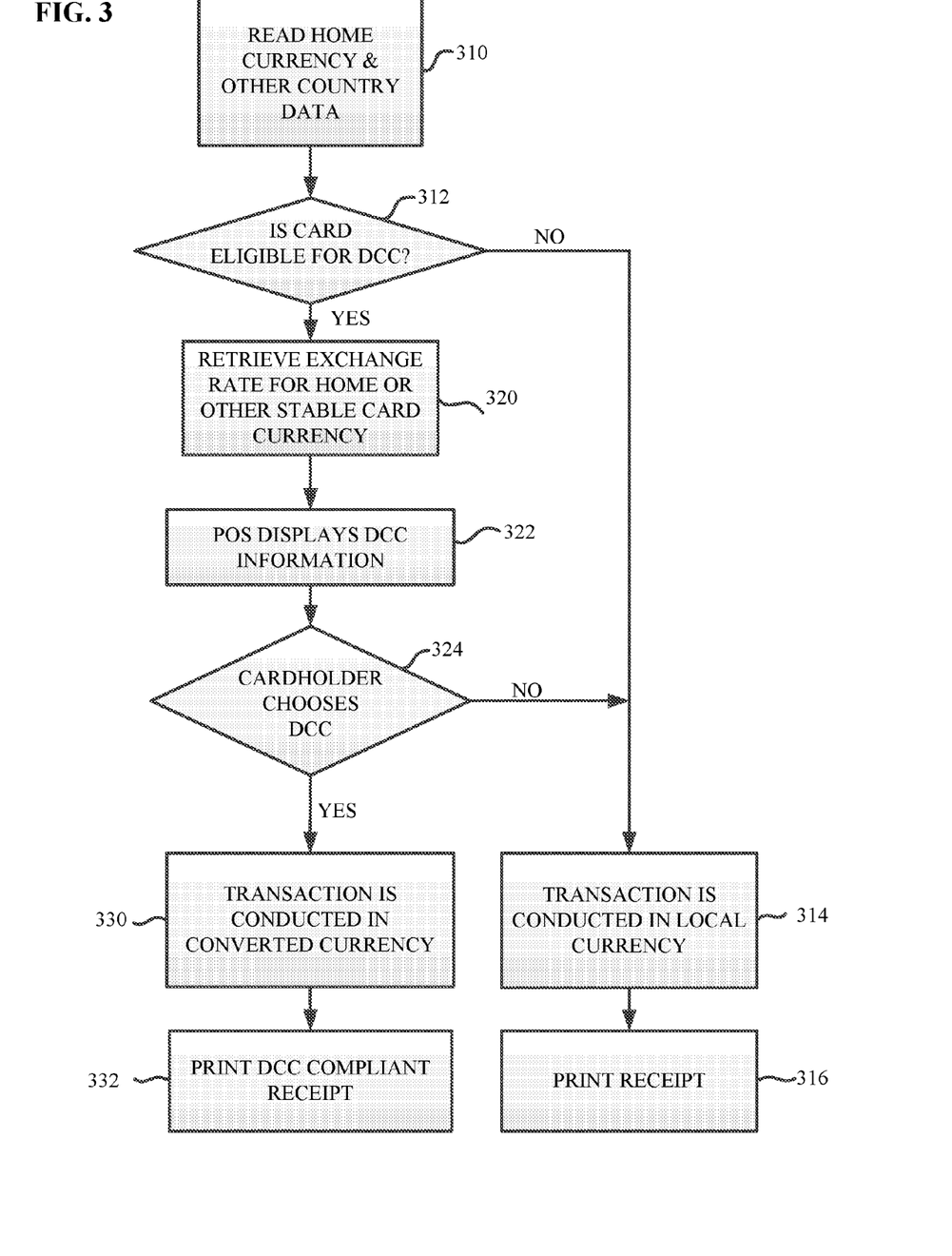
FIG. 3 is a flow diagram illustrating transactions conducted at a POS terminal when the customer uses a chip card having a stored data that may be used to determine whether to conduct a transaction in a merchant local currency, in a cardholder home currency, or in some other, stable currency.

FIG. 3 illustrates a process used when the smart card presented at a POS terminal 110 does have currency card data (e.g., an application currency cod) or other relevant country data, at steps 214 and 216 (FIG. 2). The card currency data or country data is read at step 310, and the POS terminal determines, step 312, whether or not the card and transaction is eligible for dynamic currency conversion. A detailed process for reading home currency and other data and determining whether a card transaction is eligible for DCC (steps 310 and 312) will be described later in conjunction with FIG. 5. It should be appreciated that, in some cases there may be direct currency conversion (DCC) but the currency offered to the customer may be one other than the card home currency (e.g., a more stable currency than the card home currency).

The chip card may not be eligible for currency conversion for various reasons. Briefly, as examples, the home currency may in fact be the same currency as the local currency, in which case the transaction is not eligible (nor would there be need for currency conversion). As another example, the merchant (or its acquirer) may choose not to convert currencies at all. In some cases, the card issuer for the card being used may not permit dynamic currency conversion for its cardholders (preferring to do all conversions itself). In other cases, the merchant's ability to dynamically convert may have been suspended by the merchant's own acquirer (e.g., because of past problems or because the fees for conversion requested by the merchant). If for these or other reasons the transaction is not eligible, then the transaction is conducted in the local currency of the merchant, step 314, e.g., after the customer has been authenticated (e.g., from a PIN entered by the customer). A receipt (showing the transaction in local currency) is printed at step 316 and provided to the customer.

If the card and transaction are eligible for dynamic currency conversion at step 312, then the POS terminal 110 retrieves, at step 320, an exchange rate for converting the currency from local currency, (e.g., based on the currency data (ACC) or other country-related data accessed from the smart card at step 310). The exchange rate is retrieved through network 112, acquirer system 118 and network 132 from the currency conversion system 130 (in response to a request from the POS terminal via the acquirer system). In alternative embodiments, the exchange rate could be returned directly from system 130 without passing through the acquirer system 118. The POS terminal uses the received exchange rate to calculate the amount of the transaction (in the converted currency) and displays that amount (as part of DCC information) at the point-of-sale terminal, step 322. The cardholder then decides whether to approve the DCC information at step 324. If not approved, then the transaction is conducted in the local currency (step 314) and a receipt is printed and provided to the customer (step 316).

If the cardholder does approve DCC information at step 324, then the transaction is processed and conducted in the converted currency (e.g., after entry of a PIN by the cardholder), and at step 330 the receipt for the transaction is printed and presented to the cardholder. Current rules used by card associations (e.g., MasterCard, Visa, American Express, etc.) may require documented evidence that the cardholder has been presented with and has approved the DCC information (amount of transaction in local currency, exchange rate used, and amount of transaction in converted currency), and the merchant can obtain a cardholder signature on the printed receipt for such purpose. When the transaction is processed using DCC, the amount of the transaction in the local currency is posted as a credit (less any fees) to the merchant's account and the amount of the transaction in the converted currency is posted as a debit to the cardholder's account.

Figure 4:
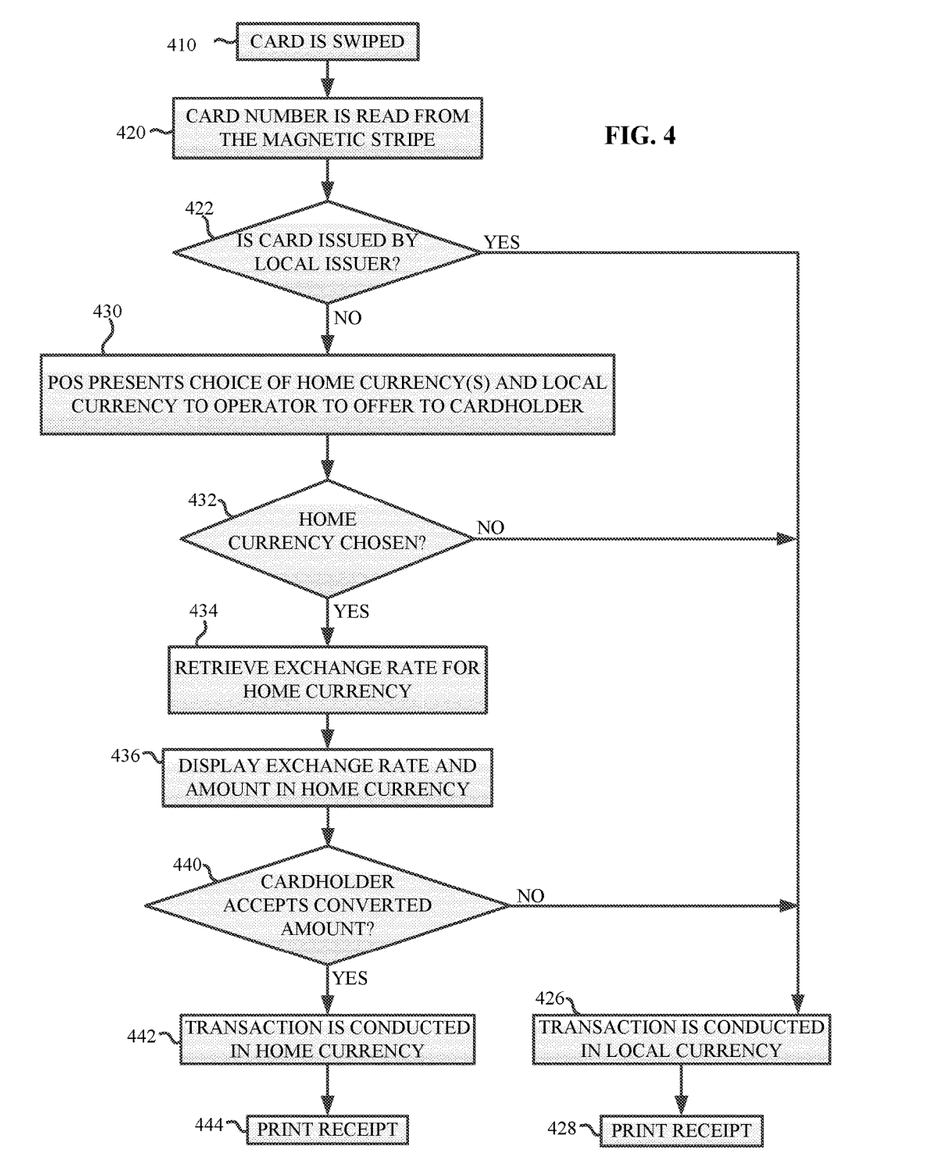
FIG. 4 is a flow diagram illustrating transactions conducted at a POS terminal when the customer uses a card having data reflecting the home currency that is stored on a magnetic stripe.

FIG. 4 illustrates a process implemented when a mag stripe is determined to be available at step 220 (FIG. 2), either because a chip card is not being used (step 212) or card currency data (or other country information) is not stored on a chip card (steps 214, 216). In this process, the card having the mag stripe is first swiped at step 410 and then the card number encoded on the stripe is read at step 420. The POS terminal uses the bank identification number (BIN) from the card number (typically part of the first 6 digits of the card number) to determine whether the card issuer is local (uses the same currency as the local currency of the merchant) at step 422. For example, if the card issuer is identified as a bank in the same country as the merchant, then the POS terminal determines that the card issuer is local at step 422. If the issuer is local, then the transaction is conducted in the local currency of the merchant (step 426) and a receipt is printed and provided to the customer/cardholder at step 428.

If the card issuer is determined not to be local at step 422, then the POS terminal presents a choice of either a home currency (typically corresponding to the location of the card issuer) or the local currency, at step 430. In many cases, there would be presented a single home currency based on the location of the card issuer. However in some cases, several choices of home currency may be provided to the customer. As an example, for a card issuer located in Europe which is likely to have customers across several European countries, the customer might be given a choice to use the local currency, use the Euro, or use several other popular European currencies.

The cardholder provides a choice of currency (step 432), and if that choice is a home currency (a currency other than the local currency of the merchant), the POS terminal 110 retrieves the exchange rate for the chosen home currency from the currency conversion system 130 (step 434). The exchange rate and the amount of the transaction in the chosen home currency is displayed at the POS terminal at step 436 for approval/acceptance by the cardholder at step 440. If accepted by the cardholder, the transaction is conducted in the selected home currency at step 442 and a receipt is printed (step 444) and provided to the cardholder.

If the cardholder either (1) does not select a home currency (a currency other than the local currency) at step 432 or (2) does not accept the exchange rate and converted transaction amount displayed at step 440, then the transaction is conducted in the local currency (step 426) and a receipt is printed (step 428) and provided to the cardholder.

Figure 5:
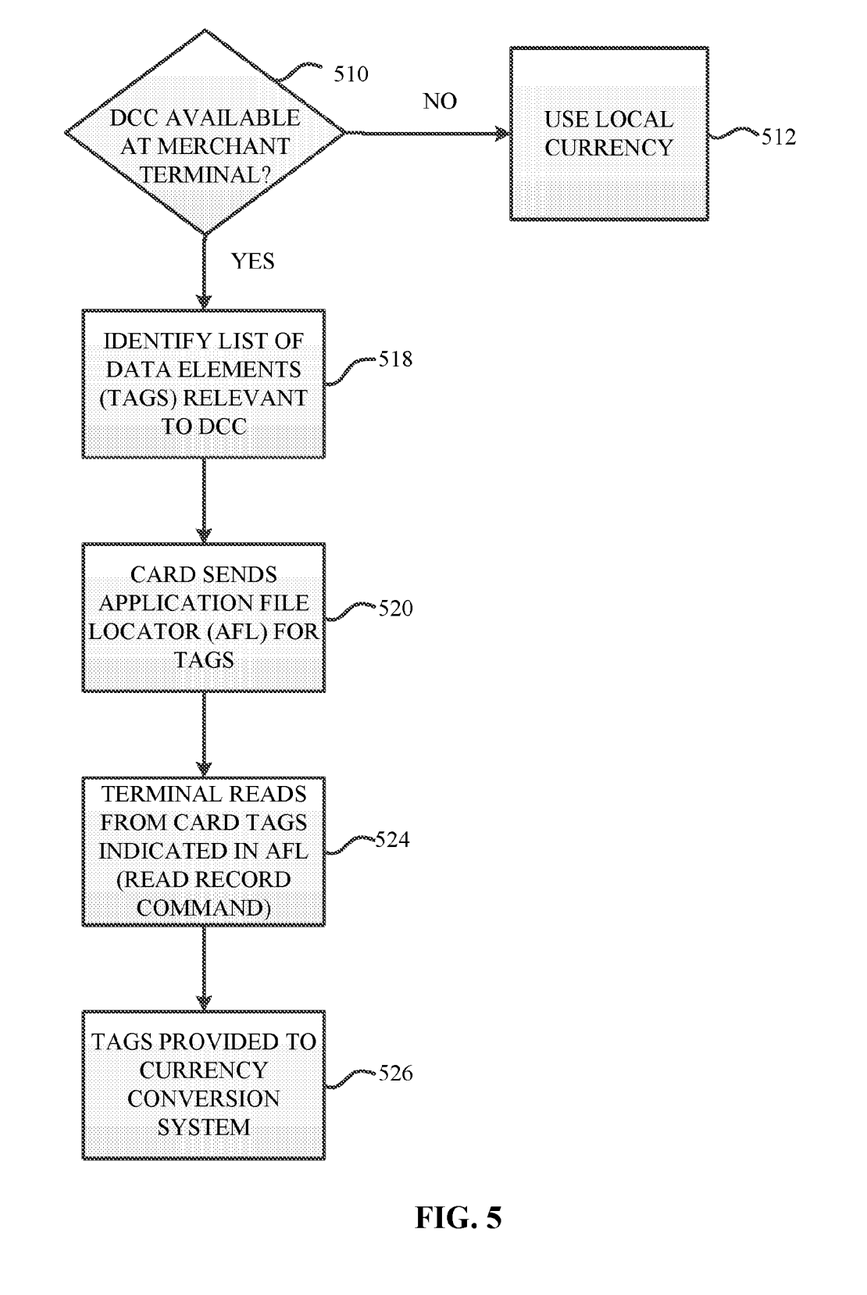
FIG. 5 is a flow diagram illustrating a process at a POS terminal for direct currency conversion, using various currency and country-related tags.

Turning now to FIG. 5, there is illustrated a process implemented at the POS terminal 110 for implementing steps 310 and 312 of FIG. 3, and more specifically, for determining whether a card transaction may use direct currency conversion (DCC) based on the use of various tags relating to currency and country at the terminal 110. In most instances, the determination of whether DCC is available is based on analysis of tags stored at the chip card or the POS terminal. However, as a preliminary step, the merchant may have preprogrammed its POS terminal not to use DCC, e.g., as because of a preference by the merchant only conduct transactions in local currency. If the merchant has so programmed the POS terminal, then at step 510 the POS terminal determines that DCC is not available and the transaction is conducted only in the local currency of the merchant, step 512.

If DCC is available at step 510, then the terminal will need to acquire various tags stored on the chip card. Reading of tags from the chip card is accomplished under the control of the application used by the terminal and chip card for purposes of processing the transaction. For example, there may be various applications supported at both the terminal and the chip card. The applications are each identified by a unique application ID (AID). The applications may determine which account of the customer the transaction is conducted against and which payment processor of the merchant may be used to process the transaction. In initiating a transaction using the previously referenced EMV standards, a mutually supported application will be selected. In some cases, it may be that only a single application among those supported by the chip card and the terminal are supported by both, and it will be used. In other cases, where multiple applications are supported, the selected application may be based on preferences of the merchant or the cardholder. In the described embodiment, the selected application includes a list of tags that will be needed by the application in order to offer DCC to the cardholder, thus identifying the list of needed tags to both the chip card and the terminal, step 518.

The acquisition of data elements or tags is accomplished by the chip card first identifying file locations in the memory of the chip card that will need to be read to determine how to convert currency. The files are identified by an Application File Locator (AFL) sent by the card to the terminal, step 520. In response to receiving the AFL, the terminal reads from the card the indicated tags using a Read Record command sent from the terminal to the card, step 524. Application data (representing the identified tags) is returned in a response to the Read Record command from the card to the terminal, and is then provided by the terminal (along with terminal data) to the currency conversion system 130, step 526, in order to determine the home or other currency that may be used for the transaction. Specific details of the structure and operation of the Application File Locator (AFL) and the Read Record command used in a card implementing EMV standards can be found at the previously referenced EMVCo website (emvco.com).

The following table illustrates an example of data elements or tags that may be retrieved from the chip card (stored as separate elements) or present (stored) at the POS terminal (pre-programmed in memory at the terminal) and sent to the currency conversion system 130.

| Table of Tags | | | |
|---|---|---|---|
| Tag ID | Tag Name | Source | Description |
| 5A | Primary Account Number | Card | The PAN includes the BIN (Bank Identification Number) which can be used to identify the country of the card issuer. |
| 5F28 | Issuer Country Code | Card | The country of issuing bank. This is often optional. If not present, the BIN may be useful to determine the issuer's country. |
| 9F1A | Terminal Country Code | Terminal | The country where the terminal (and transaction) is being conducted. |
| 9F42 | Application Currency | Card | This is the home |

-continued

Table of Tags

| Tag ID | Tag Name | Source | Description |
|---|---|---|---|
| | Code (ACC) | | currency of the card. It is often optional. |
| 42 | Issuer Identification Number | Card | This is the BIN. This is optional. If not present, the BIN may be derived from the PAN. |
| 5F2D | Language Preference Code | Card | This is the language preference of the cardholder. |

Figure 6:
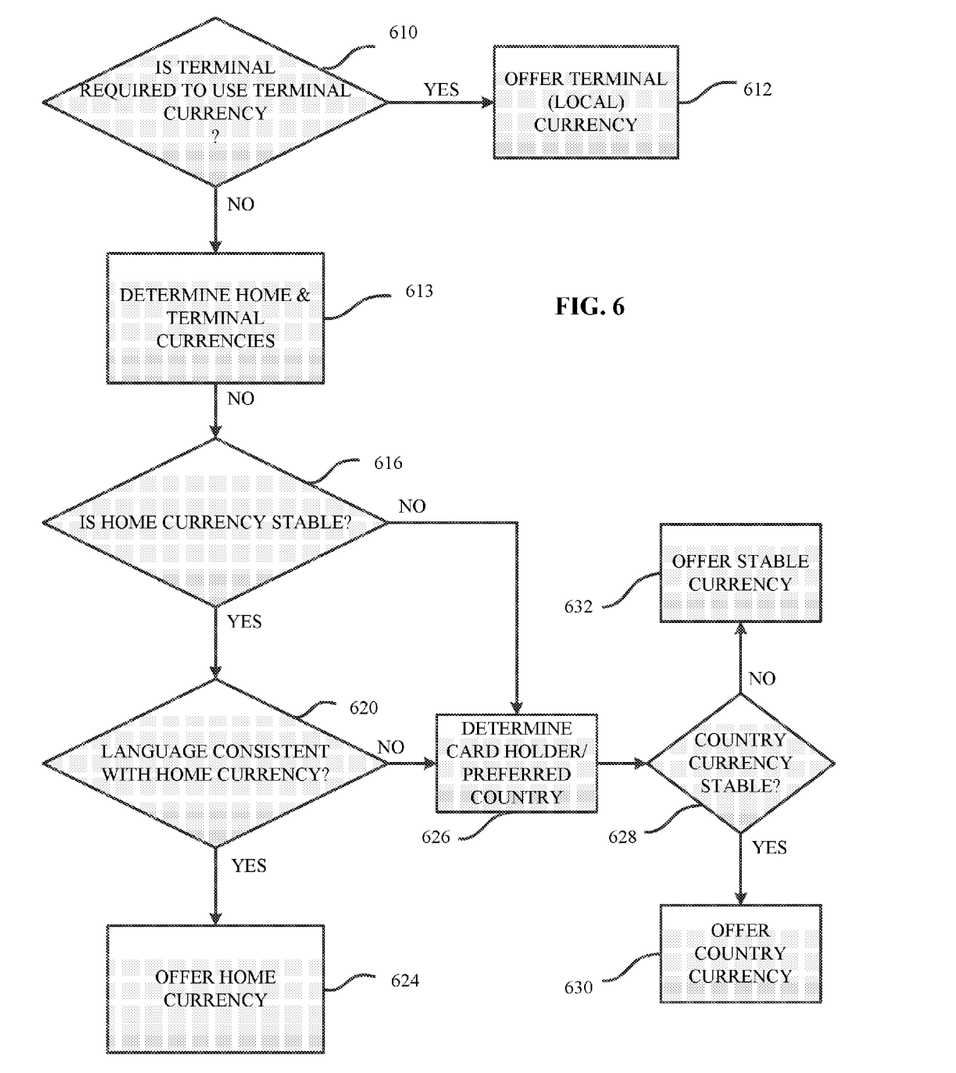
FIG. 6 is a flow diagram illustrating a process at a currency conversion system for implementing direct currency conversion.

FIG. 6 illustrates a process implemented by the currency conversion system 130 using the above tags for converting a transaction from a local currency (of a POS terminal) into a home currency or another currency. At step 610, the system 130 first determines if the terminal is required to use the local terminal currency. This might be due to the merchant not wanting to use DCC (as mentioned earlier), and the system 130 recognizes the terminal as one (of perhaps many) in use by that merchant. Also, in some cases, the acquirer or issuer may choose (e.g., temporarily) not to use DCC for various reasons, such as sudden instability in the currency markets. If the terminal is being required to use the terminal currency, then the system responds to the terminal that it should offer the local, terminal currency (whatever that currency might be), step 612. If the terminal is not being required to use the terminal currency, the system 130 then determines both the home currency and the terminal currency, step 613. The home currency will be determined by the Application Currency Code tag if present, and if not present, by the BIN in the Primary Account Number tag or the Issuer Identification Number tag. The terminal currency will be determined by the Terminal Country Code tag. The system next determines if the home currency is stable (e.g., is not subject to volatility and is from a major country, as described earlier), step 616. If the home currency is stable at step 616, then the system 130 next determines if the preferred language of the cardholder is consistent with the home currency, step 620. The preferred language is provided by the Language Preference tag. In most circumstances the cardholder would have a preferred language consistent with his or her home currency at step 620. The system 130 determines that the home currency should be offered, step 624, and returns a message to the terminal 110 to offer the home currency for selection/approval at the POS terminal (steps 322 and 324, FIG. 3).

In some circumstances, however, the preferred language may not be consistent. For example, a foreign national may be temporarily living in another country and has opened a credit card account in the temporary country, but in many circumstances, when conducting a transaction in a third country, the foreign national may prefer to conduct transactions using the foreign national's own country. The language preference may indicate the foreign national's country of origin, and that country's currency, if stable, can be offered to the cardholder. Thus, at step 626 (if the card home currency is not consistent with the language preference at step 620, or if the card home currency is determined not to be stable at step 616) the system may be able to determine the cardholder country of origin or another preferred country of the cardholder (other than the country of the home currency) based on the language preference (perhaps also taking into account the country of home currency). As a specific example, British citizens in Hong Kong (because of its status as a former British colony) may have long used an account from a bank in Hong Kong, but may prefer to use British currency when using the card account to make purchases in a third country, such as the US. At step 626, the system 130 may look at the language preference of the cardholder. In this specific example, if the preferred language is English rather than Chinese, the system may determine at step 626 that the cardholder may a British citizen (or even if not a British citizen, that the UK may be a preferred country for transaction currency). If the determined country has a stable currency (step 628), that determined country's currency (British pounds in the specific example) may be offered to the cardholder at step 630 for the cardholder to select (e.g., at step 324, FIG. 3). However, if the determined country at step 626 has a currency that is not stable (step 628), then some other stable currency is offered to the cardholder, step 632.

Figure 7:
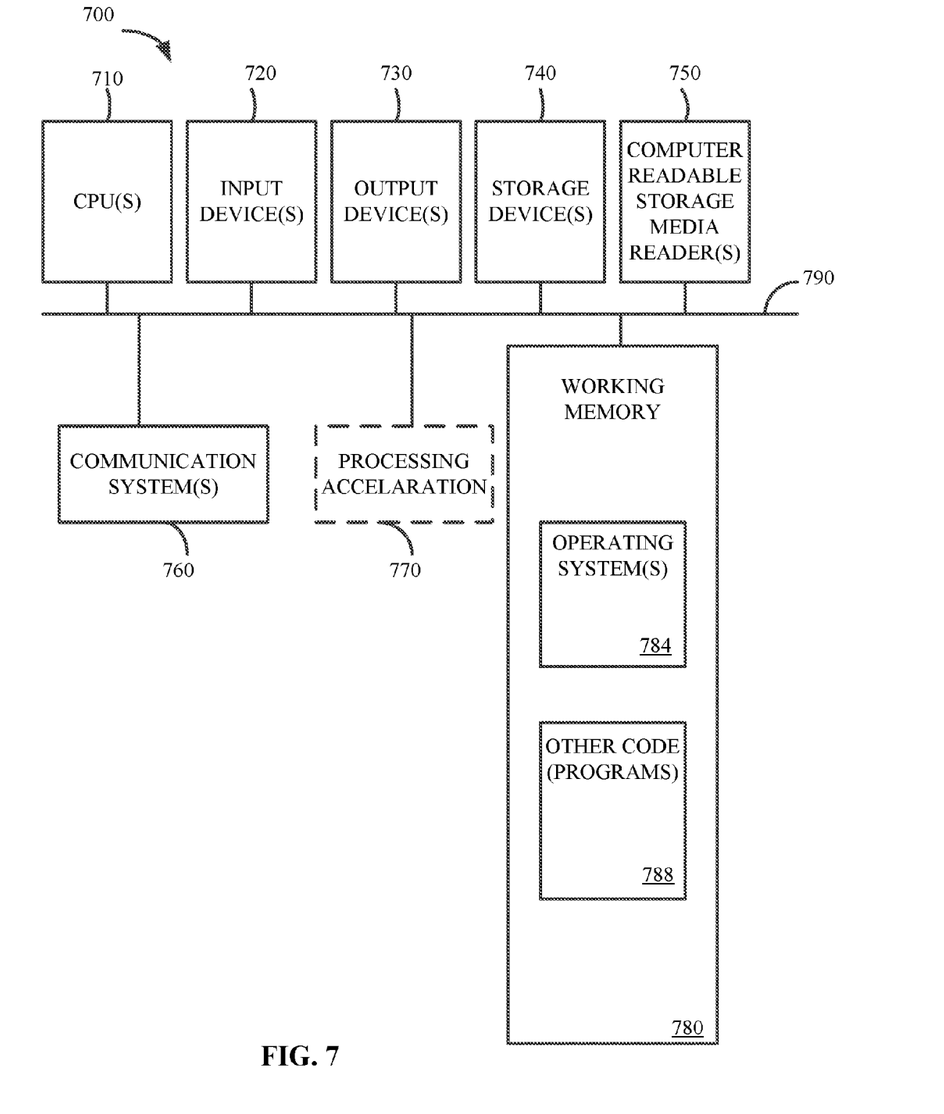
FIG. 7 is a block diagram illustrating an exemplary computer system upon which embodiments of the present invention may be implemented.

FIG. 7 is a block diagram illustrating an exemplary computer system upon which embodiments of the present invention may be implemented. This example illustrates a computer system 700 such as may be used, in whole, in part, or with various modifications, to provide the functions of the POS terminals 110, the acquirer systems 118 and the currency conversion system 130, as well as other components and functions of the invention described herein.

The computer system 700 is shown comprising hardware elements that may be electrically coupled via a bus 790. The hardware elements may include one or more central processing units 710, one or more input devices 720 (e.g., a mouse, a keyboard, etc.), and one or more output devices 730 (e.g., a display device, a printer, etc.). The computer system 700 may also include one or more storage devices 740, representing remote, local, fixed, and/or removable storage devices and storage media for temporarily and/or more permanently containing computer-readable information, and one or more storage media reader(s) 750 for accessing the storage device(s) 740. By way of example, storage device(s) 740 may be disk drives, optical storage devices, solid-state storage devices such as a random access memory ("RAM") and/or a read-only memory ("ROM"), which can be programmable, flash-updateable or the like.

The computer system 700 may additionally include a communications system 760 (e.g., a modem, a network card—wireless or wired, an infra-red communication device, a Bluetooth™ device, a near field communications (NFC) device, a cellular communication device, etc.). The communications system 760 may permit data to be exchanged with a network, system, computer, mobile device and/or other component as described earlier. The system 700 also includes working memory 780, which may include RAM and ROM devices as described above. In some embodiments, the computer system 700 may also include a processing acceleration unit 770, which can include a digital signal processor, a special-purpose processor and/or the like.

The computer system 700 may also comprise software elements, shown as being located within a working memory 780, including an operating system 784 and/or other code 788. Software code 788 may be used for implementing functions of various elements of the architecture as described herein. For example, software stored on and/or executed by a computer system, such as system 700, can be used in implementing the processes seen in FIGS. 2, 3, 4, 5 and 6 thus provide specially designed and programmed devices (e.g., chip cards, POS terminals 110, and currency conversation systems 130) for carrying out the unique elements of those processes and the novel features described herein.

It should be appreciated that alternative embodiments of a computer system 700 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the acquirer system 118 and currency conversion system 130 may each be implemented by a single system having one or more storage device and processing elements. As another example, the acquirer system 118 and currency conversion system 130 may each be implemented by plural systems, with their respective functions distributed across different systems either in one location or across a plurality of linked locations.

Moreover, while the various flows and processes described herein (e.g., those illustrated in FIGS. 2, 3, 4, 5 and 6) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for processing a card transaction conducted by a cardholder at a point-of-sale (POS) terminal operated by a merchant, wherein the merchant conducts business using a local currency, wherein the card is issued for transactions using a home currency, and wherein the transaction is processed at the POS terminal using a payment application common to the card and to the POS terminal, the method comprising:

determining whether the card stores application currency data identifying the home currency, the application currency data comprising an application currency code stored as a tag on the card;

determining whether the card separately stores country-related data that may identify the home currency, the country-related data comprising tags stored on the card and taken from a group consisting of a primary account number, issuer country code, issuer identification number, and language preference code, wherein the language preference code indicates a language that is the preferred language of the cardholder, wherein the payment application includes a list of tags to be used in processing the transaction, including tags for the application currency code, primary account number, issuer country code, issuer identification number, language preference code, and terminal country code;

using a Read Record command from the POS terminal to access the application currency data and country-related data stored on the card;

accessing terminal country code data stored at the POS terminal;

sending, to a currency conversion system remote from the POS terminal, a request for an exchange rate based on the accessed application currency data and the country-related data from the card and the accessed terminal country code stored at the POS terminal, wherein the currency conversion system determines whether the preferred language of the cardholder as indicated by the language preference code is consistent with the home currency, and wherein the exchange rate is further based on the determination of whether the preferred language of the cardholder as indicated by the language preference code is consistent with the home currency;

in response to the request, receiving the exchange rate from the currency conversion system;

calculating at the POS terminal the amount of the transaction based on the received exchange rate; and receiving, at the POS terminal, approval from the cardholder for the calculated amount of the transaction.

2. The method of claim 1, wherein the primary account number includes a bank identification number of the issuer of the card and wherein the currency conversation system determines a home currency based on the bank identification number or the issuer identification number.

3. The method of claim 1, further comprising:

selecting an application resident on the POS terminal and the card for use in processing the transaction; and sending, from the card to the POS terminal under the control of the selected application, an application file locator from the card to the POS terminal identifying memory locations on the card for accessing the application currency data and the country-related data stored on the card.

4. The method of claim 1, wherein determining whether the card stores application currency data comprises:

determining whether the card comprises a chip card, and if the card comprises a chip card, determining whether application currency data is stored in memory on the chip card; and if the card does not comprise a chip card, determining whether a mag stripe is present on the card, and if a mag stripe is present on the card, reading a card number from the mag stripe.

5. The method of claim 4, further comprising:
if the card does not comprise a chip card, and if a mag stripe is not present on the card, conducting the transaction in the local currency.

6. The method of claim 5, wherein if a mag stripe is present on the card, the method further comprises:
determining the location of the issuer based on a primary account number read from the mag stripe;
presenting to the cardholder at the POS terminal a choice of a currency from a group of currencies comprising: (1) one or more possible foreign currencies corresponding to the location of the issuer and (2) the local currency of the merchant.

7. The method of claim 1, wherein, when the currency conversion system determines that the language preference code is not consistent with the home currency, the exchange rate received from the currency conversion system is determined from a preferred country of the cardholder, based on the language preference indicated by the language preference code.

8. The method of claim 7, wherein the currency conversion system further determines if the currency of a preferred country of the cardholder is stable.

9. A system for processing a card transaction conducted by a cardholder at a point-of-sale (POS) terminal operated by a merchant, wherein the merchant conducts business using a local currency, wherein the card is issued for transactions using a home currency, and wherein the transaction is processed at the POS terminal using a payment application common to the card and to the POS terminal, the system comprising:
a processor; and
a memory, the memory storing instructions that are executable by the processor and configure the system for:
determining whether the card stores application currency data identifying the home currency, the application currency data comprising an application currency code stored as a tag on the card;
determining whether the card separately stores country-related data that may identify the home currency, the country-related data comprising tags stored on the card and taken from a group consisting of a primary account number, issuer country code, issuer identification number, and language preference code, wherein the language preference code indicates a language that is the preferred language of the cardholder,
wherein the payment application includes a list of tags to be used in processing the transaction, including tags for the application currency code, primary account number, issuer country code, issuer identification number, language preference code, and terminal country code;
using a Read Record command from the POS terminal to access the application currency data and country-related data stored on the card;
accessing terminal country code data stored at the POS terminal;
sending, to a currency conversion system remote from the POS terminal, a request for an exchange rate based on the accessed application currency data and the country-related data from the card and the accessed terminal country code stored at the POS terminal, wherein the currency conversion system determines whether the preferred language of the cardholder as indicated by the language preference code is consistent with the home currency, and wherein exchange rate is further based on the determination of whether the preferred language of the cardholder as indicated by the language preference code is consistent with the home currency;
in response to the request, receiving the exchange rate from the currency conversion system; calculating at the POS terminal the amount of the transaction based on the received exchange rate; and
receiving, at the POS terminal, approval from the cardholder for the calculated amount of the transaction.

10. The system of claim 9, wherein the primary account number includes a bank identification number of the issuer of the card and wherein the currency conversation system determines a home currency based on the bank identification number or the issuer identification number.

11. The system of claim 9, wherein instructions that are executable by the processor further configure the system for:
selecting an application resident on the POS terminal and the card for use in processing the transaction; and
sending, from the card to the POS terminal under the control of the selected application, an application file locator from the card to the POS terminal identifying memory locations on the card for accessing the application currency data and the country-related data stored on the card.

12. The system of claim 9, wherein determining whether the card stores application currency data comprises:
determining whether the card comprises a chip card, and if the card comprises a chip card, determining whether application currency data is stored in memory on the chip card; and
if the card does not comprise a chip card, determining whether a mag stripe is present on the card, and if a mag stripe is present on the card, reading a card number from the mag stripe.

13. The system of claim 12, wherein instructions that are executable by the processor further configure the system for:
if the card does not comprise a chip card, and if a mag stripe is not present on the card, conducting the transaction in the local currency.

14. The system of claim 13, wherein if a mag stripe is present on the card, the instructions that are executable by the processor further configure the system for:
determining the location of the issuer based on a primary account number read from the mag stripe;
presenting to the cardholder at the POS terminal a choice of a currency from a group of currencies comprising: (1) one or more possible foreign currencies corresponding to the location of the issuer and (2) the local currency of the merchant.

15. The system of claim 9, wherein, when the currency conversion system determines that the language preference code is not consistent with the home currency, the exchange rate received from the currency conversion system is determined from a preferred country of the cardholder, based on the language preference indicated by the language preference code.

16. The system of claim 15, wherein the currency conversion system further determines if the currency of a preferred country of the cardholder is stable.

* * * * *